(12) United States Patent
Li

(10) Patent No.: US 7,961,186 B2
(45) Date of Patent: Jun. 14, 2011

(54) BRICK-BASED FUSION RENDERER

(75) Inventor: Wei Li, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 986 days.

(21) Appl. No.: 11/753,092

(22) Filed: May 24, 2007

(65) Prior Publication Data

US 2007/0247459 A1 Oct. 25, 2007

Related U.S. Application Data

(63) Continuation-in-part of application No. 11/235,410, filed on Sep. 26, 2005, now Pat. No. 7,711,162.

(60) Provisional application No. 60/853,865, filed on Oct. 24, 2006.

(51) Int. Cl.
*G06T 17/00* (2006.01)
*G06T 15/00* (2011.01)

(52) U.S. Cl. ........................................ 345/424; 345/419

(58) Field of Classification Search ........................ None
See application file for complete search history.

(56) References Cited

U.S. PATENT DOCUMENTS

| | | | | |
|---|---|---|---|---|
| 6,556,199 B1* | 4/2003 | Fang et al. | ...................... | 345/424 |
| 7,133,041 B2* | 11/2006 | Kaufman et al. | .............. | 345/419 |
| 7,356,367 B2* | 4/2008 | Liang et al. | ..................... | 600/407 |
| 2005/0228250 A1 | 10/2005 | Bitter | | |
| 2006/0012599 A1* | 1/2006 | Blask et al. | ..................... | 345/424 |
| 2006/0164410 A1 | 7/2006 | Li | | |
| 2007/0206008 A1* | 9/2007 | Kaufman et al. | .............. | 345/424 |

OTHER PUBLICATIONS

Bönning, R. and Müuller, H. 2002. Interactive sculpturing and visualization of unbounded voxel volumes. In Proceedings of the Seventh ACM Symposium on Solid Modeling and Applications (Saarbrücken, Germany, Jun. 17-21, 2002). SMA '02. ACM, New York, NY.*
S. Grimm, S. Bruckner, A. Kanitsar, and E. Groller. Flexible direct multi-volume rendering in dynamic scenes. In VMV, Nov. 2004.*
A. Quon et al.: "Flying Through" and "Flying Around" a PET/CT Scan: Pilot Study and Development of 3D Integrated $^{18}$F-FDG PET/CT for Virtual Bronchoscopy and Colonoscopy, Society of Nuclear Medicine, 2006, Journal of Nuclear Medicine, vol. 47, Issue 7, Jul. 1, 2006, S. 1081-1087 & Contents (5 S.), http://inm.snmjournals.org/content/vol47/issues7/; eHB.
Texture Paritioning and Packing for Acceleratng Texture-Based Volume Rendering Li, et al. In Graphics Interace, 2003, S. 81-88.
Empty Space Skipping and Occlusion Clipping for Texture-Based Volume Rendering Li, et al. In Proceedings of the 14th IEEE Visualization Conference, 2003 (pp. 317-324).

* cited by examiner

*Primary Examiner* — Daniel F Hajnik
(74) *Attorney, Agent, or Firm* — Donald B. Paschburg

(57) ABSTRACT

A method for combining at image data sets to generate a composite image. The method divides each of the data sets into a plurality of bricks along three mutually orthogonal axes. The method includes (a) building a hierarchical structure for each one of the at least two data sets, each structure comprising higher level blocks of voxels and lower level blocks of voxels, the higher level blocks having a larger number of voxels than the lower level blocks; (b) expanding boundaries of each one of the structures into corresponding expanded hierarchical structures, such boundary expanding comprising adding additional virtual processing bricks to the initial processing bricks, such virtual processing bricks comprising semi-unbounded blocks to provide the expanded boundaries of the expanded hierarchical structures; and (c) rendering each one of the bricks in each one of the expanded hierarchical structures into a two dimension image.

10 Claims, 7 Drawing Sheets

BRICK-BASED FUSION RENDERER

CROSS-REFERENCE TO RELATED APPLICATIONS

This application claims priority to U.S. Provisional Application No. 60/853,865, which was filed on Oct. 24, 2006, and which is fully incorporated herein by reference.

This application is also a continuation in part of my copending patent application Ser. No. 11/235,410 filed Sep. 26, 2005 and claims the benefit of the filing date of such copending application.

TECHNICAL FIELD

The present invention relates generally to the field of imaging, and, more particularly, to brick-based fusion renderers used in such field imaging.

BACKGROUND AND SUMMARY

As is known in the art, modern medical technology provides different modalities for acquiring 3D data, such as computed tomography ("CT"), magnetic resonance imaging ("MRI"), positron emission tomography ("PET"), and ultrasound. The information obtained from different modalities is usually complementary; for example, CT provides structural information while PET provides functional information. Thus, it is generally desirable to fuse multiple volumetric datasets.

FIG. 1 presents a sample-fused image where functional data from PET is correlated with structural information from CT. FIG. 1 shows a sample fused rendering. The image on the left (FIG. 1(a)) shows structural information derived from a 512×512×512×12-bit CT dataset, while the image in the center (FIG. 1(b)) shows functional information derived from a 256×256×256×16-bit dataset PET dataset. The image on the right (FIG. 1(c)) is a simple fusion of the CT and PET datasets correlating structural and functional information. The "negatives" of each of the images is shown to facilitate printed reproduction.

Most existing fusion renderers require that all volumes be aligned and have the same resolution, thereby necessitating that all volumes be re-sampled except the one that is treated as the reference volume. The reference volume generally refers to the volume with the finest resolution to avoid losing information—the other volumes are re-sampled according to the grid of the reference volume. The reference volume may need to be expanded to fill the bounding box enclosing all volumes. The aggregate bounding box of the ensemble of volumes can be significantly larger than individual bounding boxes when the orientation of a volume happens to lie near the diagonal of another volume. The number of voxels after re-sampling is proportional to the volume of the aggregate bounding box. Therefore, re-sampling can significantly increase the processing time (both initially and for each rendering) as well as the amount of memory required.

The volumes usually need to be registered because different scanners can have different coordinate systems (in terms of origins and orientations). During registration all volumes, except the reference volume, are referred to as floating volumes. Various transformations, such as rotation, translation, scaling, and shearing, are applied to the floating volumes so that their features match those in the reference volume. Furthermore, re-sampling must be performed again after such a transformation. Registration typically requires user interaction, with visual feedback, that is repeatedly applied to refine the registration. The resample-based fusion render cannot response quickly enough for such requirements.

Bricking is an important technique in texture-based volume rendering. In principle, bricking partitions a volumetric dataset into multiple sub-volumes, each called a brick. The purpose of bricking mainly falls to two. 1) Bricks containing only invisible voxels are skipped to gain acceleration; 2) Volumes larger than graphics memory can be rendered by downloading a subset of all the bricks to graphics memory for each rendering pass. With multiple rendering passes, all the visible voxels are processed. Within each brick, voxels can be further subdivided into blocks, and invisible blocks are skipped. Therefore, the minimal granularity of rendering is block, while the minimal granularity of texture downloading is brick. Obviously, a block has to be completely enclosed in the corresponding brick. See Wei Li, "Invisible Space Skipping with Adaptive Granularity for Texture-based Volume Rendering", Published U.S. Patent Application Pub. No. 2006/0164410 published Jul. 27, 2006 assigned to the same assignee as the present invention, the entire subject matter being incorporated herein by reference, for more details about bricking.

A fusion renderer handles multiple volumes that usually overlap in 3D space. As discussed in co-pending U.S. patent application Ser. No. 11/235,410 filed Sep. 26, 2005, assigned to the same assignee as the present invention, the subject matter thereof being incorporated herein by reference. The basic idea described in U.S. patent application Ser. No. 11/235,410 is to render a whole slice through all blocks, hence performing the rendering in slice-by-slice order, instead of block-by-block. Briefly, the method includes the steps of: (a) building a hierarchical structure for each of a plurality of volumes; (b) finding all blocks in each of the hierarchical structures that intersect a slicing plane; (c) dividing each of the plurality of volumes into stacks of parallel slices and sorting the parallel slices by visibility order; (d) choosing a next slice in the sorted parallel slices, the next slice belonging to a current volume; (e) changing rendering parameters if the current volume is different from a previous volume in a previous iteration of step (d); (f) rendering, based on the rendering parameters, the next slice by intersecting the slicing plane with the blocks corresponding to the current volume; and (g) repeating steps (d)-(f) until all of the sorted parallel slices are rendered. It is desirable to keep each volume independent, rather than resampling them to the same resolution. Each volume maintains its own space-skipping structure. This has the advantage in rendering speed, memory consumption, and flexibility.

When a dataset is partitioned into bricks, not all voxels are accessible during a rendering pass. Therefore, an algorithm combining bricking and fusion have to guarantee that those inaccessible voxels are not rendered for the current pass, and any visible voxels are rendered exactly once. It is a challenging task, especially when invisible bricks and blocks are skipped. For simplicity, the previous co-pending U.S. patent application Ser. No. 11/235,410 only handles a simplified bricking scheme. That is, a volume is only bricked along the Z axis. In other words, each brick has at most two neighbors.

Bricking only in Z results in slab-shaped bricks, which unfortunately is less efficient in performance. Besides due to graphics hardware limitation, dataset whose X and Y sizes exceeding certain number, currently it is 512, cannot be rendered. Graphics memory is a precious resource in a system.

In accordance with the present invention, a method is provided for combining at least two three-dimensional image data sets to generate a composite image from the data sets. The method includes dividing each one of the data sets into a plurality of bricks along three mutually orthogonal axes. With such method, there is greater flexibility in selecting the shape/size of bricks resulting in better performance.

In one embodiment, a method is provided for combining at least two three-dimensional image data sets to generate a composite image from the data sets. The method includes: (a) building a hierarchical structure for each one of the at least two data sets, each hierarchical structure comprising higher level blocks of voxels of the data set thereof and lower level blocks of voxels of the data set thereof, the higher level blocks having a larger number of voxels than the lower level blocks, wherein one or more blocks occupy a single one of a plurality of initial processing bricks; (b) expanding boundaries of each one of the structures into corresponding expanded hierarchical structures, such boundary expanding comprising adding additional virtual processing bricks to the initial processing bricks, such virtual processing bricks comprising semi-un-bounded blocks to provide the expanded boundaries of the expanded hierarchical structures; and (c) rendering each one of the bricks in each one of the expanded hierarchical structures into a two dimension image, such rendering.

With such method, each volume (i.e., data set) is expanded into a block tree having expanded nodes, so that the tree covers the whole 3D space, instead of limited by the bounding box of the volume. Rendering using the expanded tree guarantees that the rendering won't miss any portion of any volume. The expanded nodes are just virtual nodes that don't contain any voxel data.

In one embodiment, the rendering comprises: (i) processing the bricks each one of the expanded hierarchical structures in order of relative visibility, such visibility order being related to distance from a viewing camera including setting flags for invisible ones of the initial processing bricks and for the virtual processing bricks with visible bricks remaining un-flagged and wherein at any time a current brick is being rendered, cut planes defining the boundary the current brick being inserted and wherein the cut planes are removed when the current brick is no longer being rendered; (ii) dividing each of the expanded hierarchical structures having therein the current un-flagged brick into stacks of parallel slices along the cut planes with flagged bricks being excluded from the parallel slices and sorting the parallel slices by the visibility order; (iii) choosing a next slice in the sorted parallel slices, the next slice belonging to a currently rendered one of the bricks; (iv) finding all blocks in each of the currently bricks intersecting a plane of the next slice chosen in the (iii); (v) fetching voxels from the founds blocks; (vi) rendering the fetched voxels into the two dimensional image; (vi) repeating (iii) through (v) until all of the sorted parallel slices are rendered; and (vii) resetting the current brick.

Combined with the cut planes, the method guarantees that any visible portion of any volume is rendered exactly once.

In one embodiment, the parallel slices are chosen independently for each of the expanded hierarchical structures to render interleaved slices.

In one embodiment, the parallel slices are of the expanded hierarchical structures are chosen to share a common set of the parallel slices to generate fused slices; the invisible flags are passed to the rendering function, so that fetching from an invisible brick is avoid and 0 is assigned as the value of voxel sample. Samples fetched from different datasets are combined according to a customizable fusion equation, i.e., the equation depends on the real application. For example, it could be just average, sum, difference, or any other way of combining the voxel values fetched from the same 3D location of different volumes.

In accordance with the present invention, a common graphics memory manager and cache are shared among multiple GPU-based renderers as described in co-pending U.S. patent application Ser. No. 11/679,990 filed Feb. 28, 2007 assigned to the same assignee as the present invention, the subject matter thereof being incorporated herein by reference. To avoid the issue of memory segmentation, it is favorable that every renderer uses the same brick size. Consequently, bricking in all the three axes is necessary.

While in patent application Ser. No. 11/235,410 referred to above, different volumes are always treated independently (i.e., it does not sample different volumes at the same 3D locations and voxels samples from different volumes are not available at the same time inside a shader program), in some scenario, this feature is required. In such a mode, the brick-based renderer must ensure the accessibility of the required voxels from all the volumes for the current rendering pass, and each sampling location in 3D space is used only once throughout the rendering of the whole frame of image.

In this invention, expanded tree deployed by the fusion renderer of interleaving slices is used; here the shader program has access to the brick visibility flags. One way is to pass the brick visibility flags as arguments to the shader. If the current brick of a volume is invisible, the shader simply avoids sampling the volume, and assigns a zero to the variable holding the sampled value, and continues the fusion computation. This needs branches inside the shader program, and may not be efficient on some GPUs. Another way is to generate multiple versions of the shader program, each corresponding to a different subset of invisible volumes. The correct shader program is then selected depending on the brick visibility flags.

Invisible space skipping inside a brick for fused slices is different from rendering of interleaving slices. For interleaving slices, the renderer takes multiple sets of polygons that represent the sampling locations. Each set of polygons covers all the visible voxels of a volume. For fused slices, there is only one set of polygons that should cover all the visible voxels from all the volumes. Using the expanded nodes ensures the coverage of the space outside any volume. Inside a volume, if a brick if invisible, it is not just skipped, but introduces necessary cut-planes, and set the brick visibility flag to false for the related volume. For rendering fused slices, invisible blocks inside a brick is handled similarly by inserting cut-planes and setting brick visibility flag.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Overview of Brick-Based Single Volume Renderer

Before getting into the details of the fusion renderer in accordance with the invention, a brief overview of the brick-based renderer for a single volume is described; more details can be found in the above referenced Published U.S. Patent Application Pub. No. 2006/0164410 published Jul. 27, 2006. A volumetric dataset is partitioned into uniformly sized blocks. Here, in this example, a block size to be 32*32*32 is selected. The blocks are then merged and organized in a hierarchical structure, referred to as a tree, with each original block being a leaf node and the root of the tree is the union of all the blocks that corresponds to the whole volume. Between the root and leafs, some merged blocks are considered as the bricks. The bricks are also uniformly sized, and a typical brick size is 64*64*64. During rendering, the tree is traversed top-down from the root. Fully invisible nodes are skipped. When the traversal reaches a brick, the corresponding sub-volume is downloaded to graphics memory if it does not exist in the brick cache. While the enclosing brick resides in graphics memory, the renderer chooses from the sub-nodes of the brick to render depending on the percentage of visible voxels enclosed by the sub-node. Within each brick, the rendering can be done either block-by-block or slice-by-slice, as described in the above referenced patent application Ser. No. 11/235,410.

Principal of Brick-Based Fusion Renderer

Figure 1A:
FIG. 1 is depicts an exemplary fused image according to the PRIOR ART.
Figure 1B:
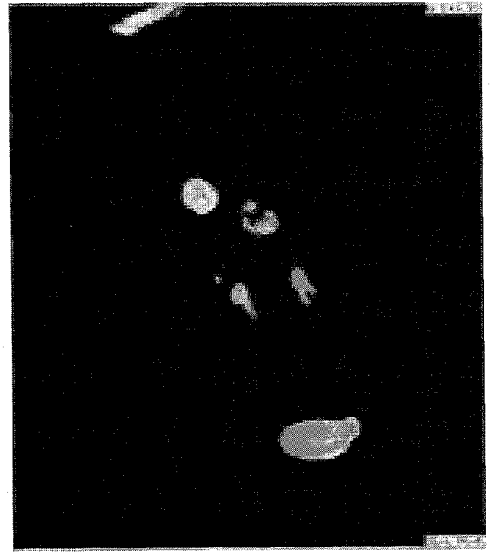
Figure 1C:
Figure 2:
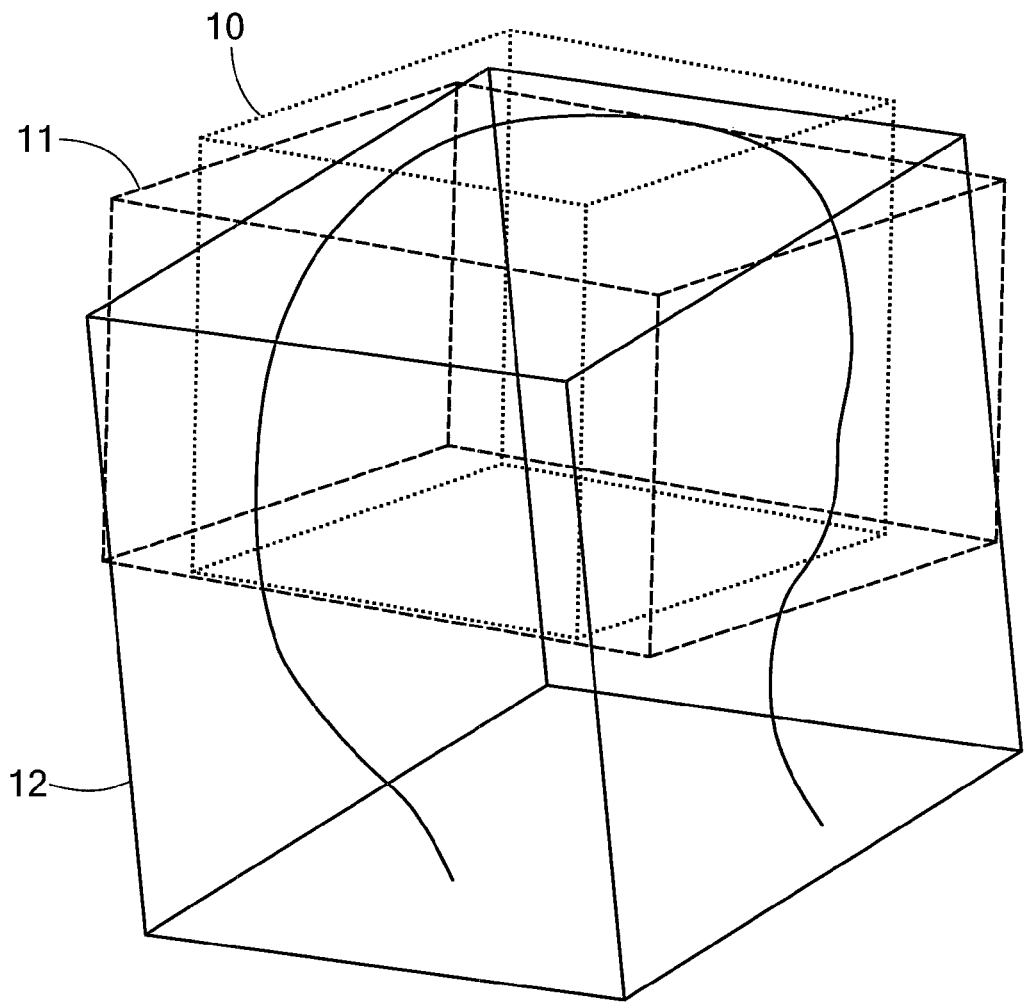
FIG. 2 shows three bounding boxes for three image data set volumes.

In fusion, the volumes could be of different sizes and are with independent rotations and translations. Therefore, the domain they cover in 3D are usually different. As shown in FIG. 2, the three bounding boxes 10, 11 and 12 show the regions that the three volumes occupy. As discussed in as described in the above referenced patent application Ser. No. 11/235,410, each volume is treated independently. That is, each one is stored in its own rectilinear grids, likely in its own resolution. In other words, we don't resample any volume to global grids.

Figure 3:
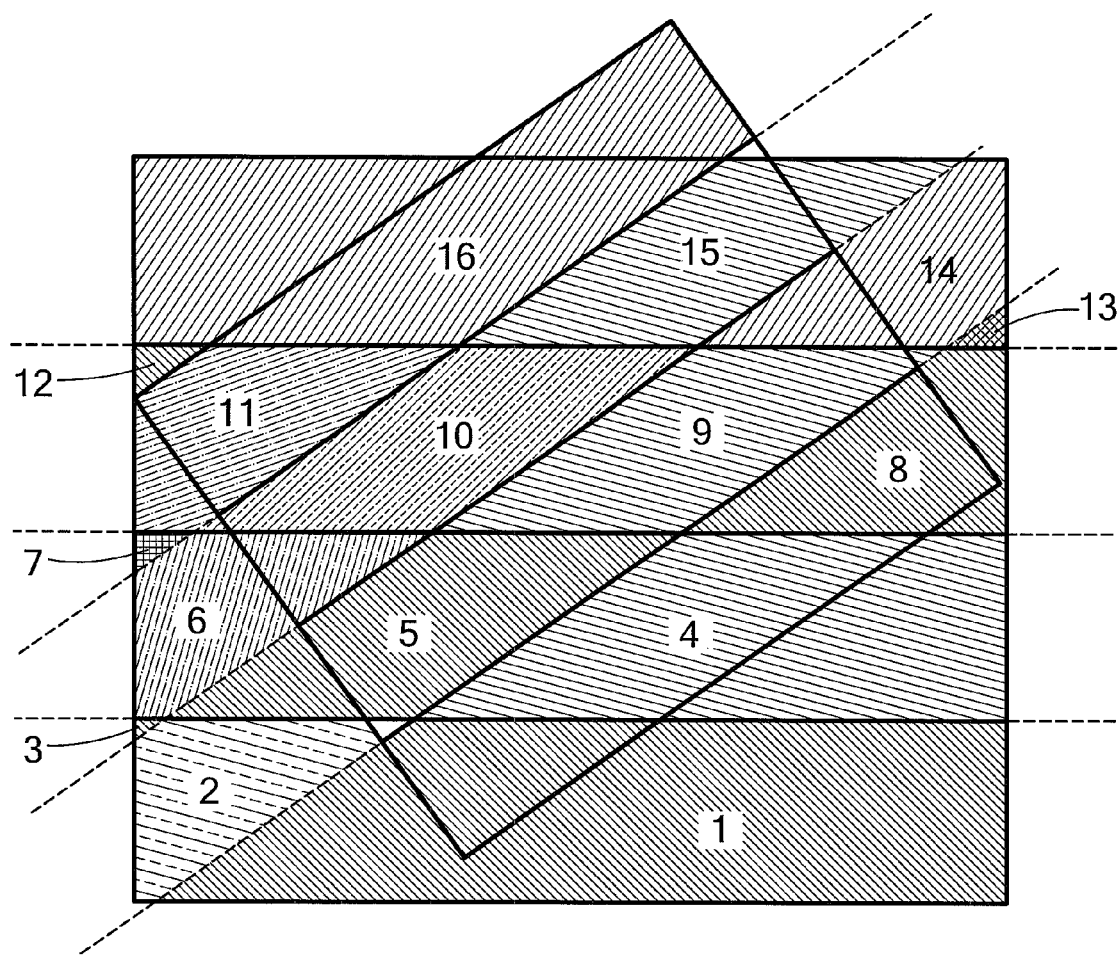
FIG. 3 shows an example of fusing two volumes, each having four bricks dotted lines represent cut-planes.
Figure 3:
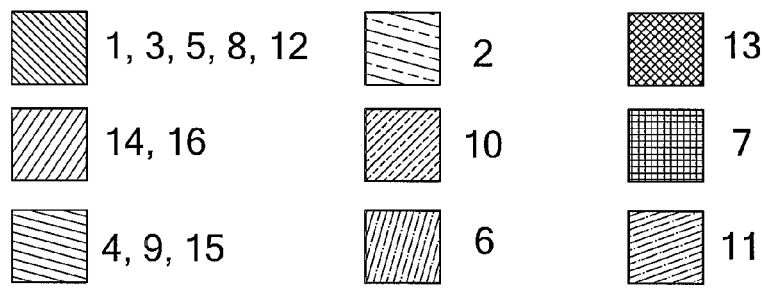

Grids of different volumes usually don't align with each other, hence are bricked independently. For simplicity and performance consideration as well as observing hardware limitation, only the texture of one brick of each volume is allowed to be active at any time. Therefore, the rendering should be restricted to within the common region of the current active bricks. Since bricks from different volumes are generally not is aligned, this is done by inserting cut-planes on the faces of the bricks. FIG. 3 shows an example of fusing two volumes, each having four bricks. The dotted lines represent cut-planes, and the regions in different numerical designation each accounts for a common region. Note that the purpose of cut-planes is to divide the space into regions. Any region defined by a set of cut planes of a volume contains at most one brick of the same volume. In the case of FIG. 3, where bricking is only applied in one direction, cut-planes aligned with volume boundaries are ignored. For example, the top brick in red corresponds to a half space defined by the cut-plane on the lower boundary of the brick. The common region defined by cut-planes are always convex. It is important that the union of all the brick regions of a volume covers the whole space, or at least the space that contains all the other volumes. Otherwise, only the common region between different volumes is rendered.

Each brick region of a volume is tested with all bricks of other volumes whether they overlap. If a common region exists, rendering is performed. Naturally, the bricks are traversed in nested loops:

```
for each brick b0 of volume 0 {
    insert cut planes according to b0
    for each brick of volume 1 {
        insert cut planes according to b1
        if there exists a common region
            render;
    }
}
```

Figure 4:
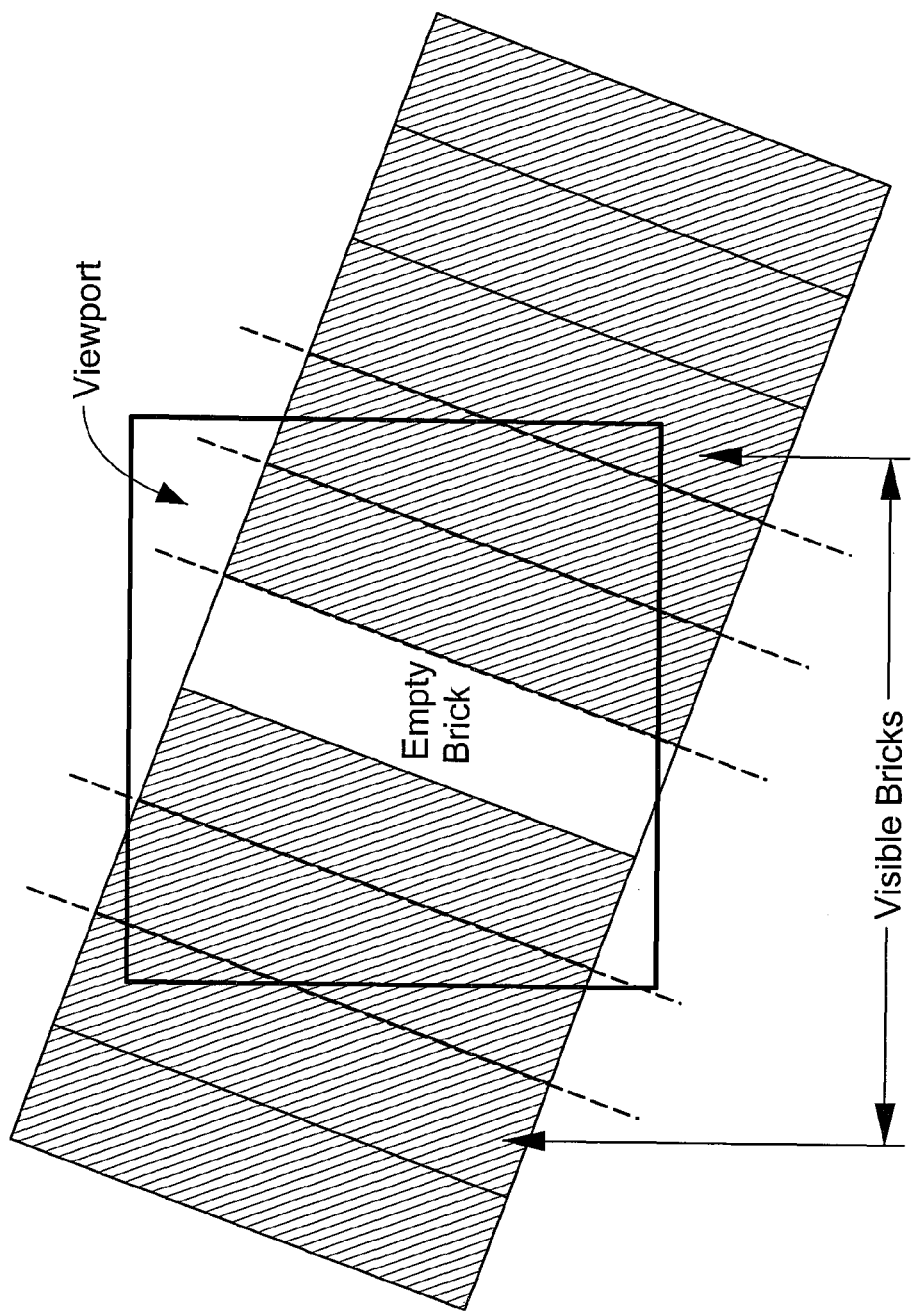
FIG. 4 illustrates a condition when some bricks fall completely outside the view port, then the cut-planes between visible and invisible bricks are also ignored, such illustration shown that there is also an empty brick in the middle of the stack and therefore one cut-plane between the empty brick and its neighboring non-empty brick is removed (i.e., when bricking just along one is, the boundary bricks or the bricks along visibility boundary are expanded, so that the whole space is covered by the union of the brick set of the volume)

It is possible that some bricks fall completely outside the view port, as shown in FIG. 4, then the cut-planes between visible and invisible bricks are also ignored. There is also an empty brick in the middle of the stack. Therefore, one cut-plane between the empty brick and its neighboring non-empty brick is removed. In other words, when bricking just along one is, the boundary bricks or the bricks along visibility boundary are expanded, so that the whole space is covered by the union of the brick set of the volume.

Expanded Tree

As described in the above referenced patent application Ser. No. 11/235,410, only a simplified case of bricking is considered, that is, a volume is only bricked along the Z axis. When allowing bricking along all of the three major axes, each brick has up to six neighbors, hence need as many as six cut-planes to define the space occupied by a brick. In such a scenario, it is usually difficult to expand the visible brick regions so that their union covers the full space while the expanded regions don't overlap with each other, especially when the visibility of bricks changes dynamically.

Figure 5:
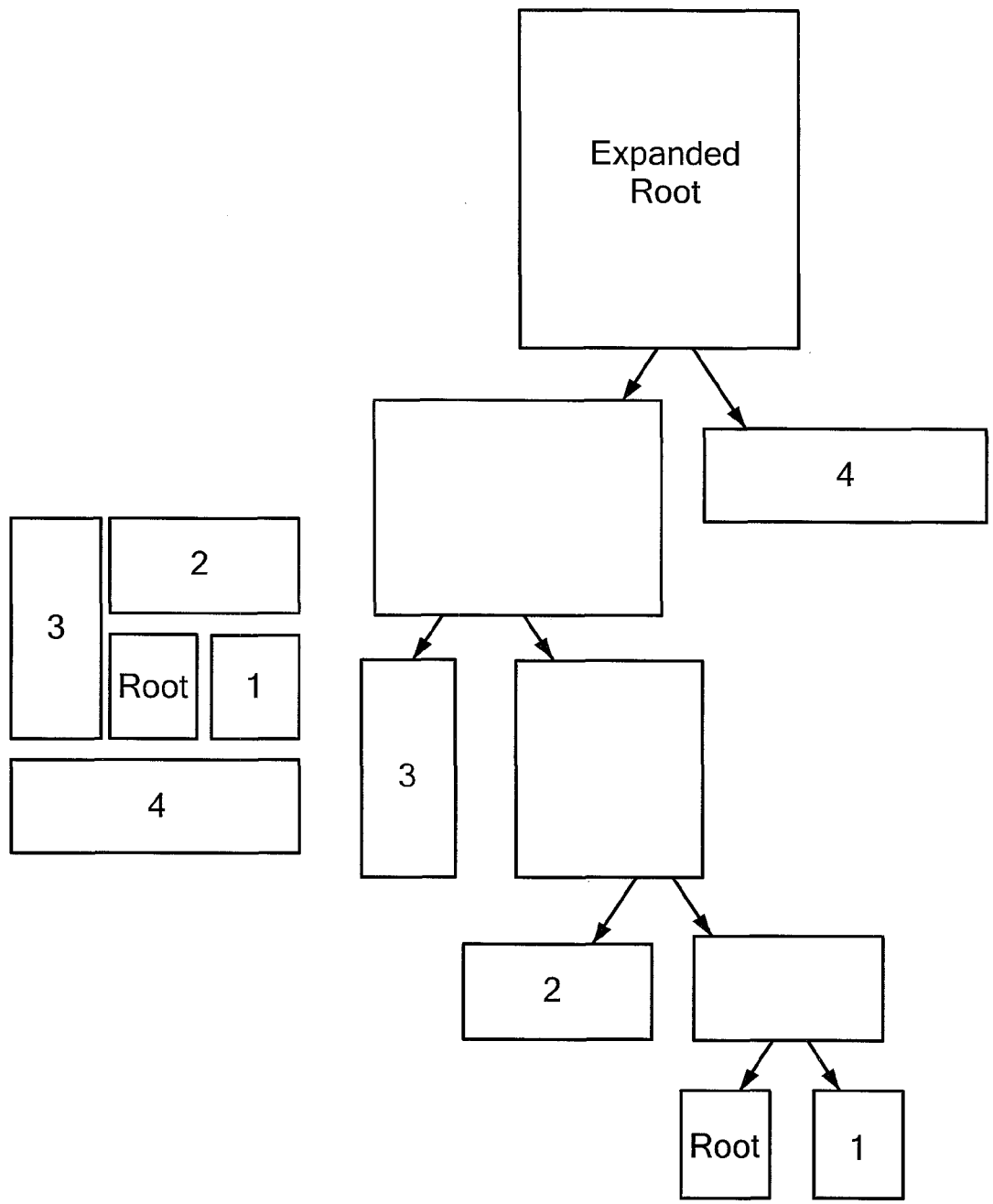
FIG. 5 shows a 2D example where an original root node is padded with four expanded nodes to cover the whole space and with dotted lines indicating the boundaries located at infinity and with the left displaying the padding, while the right shows the tree containing the expanded nodes and the root, here a binary tree is used for illustration.

As mentioned before, the blocks of a volume are organized is a tree structure. The root node of the tree is exactly the bounding box of the volume. We propose to expand the tree in order to cover the full space. The process adds an expanded root that covers the whole space, as well as internal expanded nodes to complete the tree structure. All these expanded nodes have one or more of their boundary face defined at infinity. FIG. 5 shows an example, where the original root node is padded with four expanded nodes to cover the whole space. Dotted lines indicate the boundaries located at infinity. The left displays the padding, while the right shows the tree containing the expanded nodes and the root. We use binary tree for illustration. The principle is similar for other trees. But the number of internal nodes may be different.

Then, for brick-based fusion, the starting node is the expanded root. Obviously, the expanded nodes are all invisible, hence involving no texture loading and rendering. They are only used to apply cut-planes. A cut-plane located at infinity is certainly ignored. For real node that is not due to expansion but is visible, the handling is similar to the expanded nodes. That is, they are only used for applying cut-planes, but we don't actually render the nodes themselves.

In rendering by treating each volume as a stack of slices as described in the above-referenced Ser. No. 11/235,410, the rendering steps in using expanded tree is similar to rendering from Z-only bricks. The only exception is that each volume has a brick-visibility flag. If the flag indicates the current brick of a volume is invisible, then the volume is not sliced. Inside the rendering loop, the function looking for the next slice among stacks of slices will simply ignore the volume with the invisible brick. If the visible brick flags of all volumes are false, nothing needs to do for the current common region of bricks.

The blocks contained in the current brick are rendered slice-by-slice, as described in the above referenced patent application Ser. No. 11/235,410. That is, a whole slice across all intersecting blocks with the brick is rendered before moving to the next slice. Invisible space skipping is inherent to the slice-by-slice rendering by skipping the invisible blocks.

Note that Z-only bricking is just a special case of the general bricking approach. Therefore, the approach using expanded tree is also applicable to z-only bricks, so long as the brick size in X and Y is specified to extend through the whole volume.

Rendering of Fused Slices

When treating the multiple volumes as fused slices before compositing the stack of slices of one volume should align with that of other volumes. That is, the shader program samples multiple volumes at the same locations, instead of allowing slices from different volumes to interleave. As described in the above referenced patent application Ser. No. 11/235,410, a method is used to decompose the fusion rule that defines how voxel samples from different volumes are combined. This however is inflexible to implement. In addition, when a fusion rule changes, the decomposition as well as the source code supporting it is likely to change. Therefore, the method in described in the above referenced patent application Ser. No. 11/235,410, does not support changing the fusion rule on the fly.

Traversal of Block Tree

Since invisible bricks and blocks cannot be just skipped, the traversal filter of block tree for the fusion renderer is also adjusted. When invisible blocks can be skipped, the traversal looks for the largest node that satisfies the criteria for rendering. Typically, the criterion is that the node is not fully clipped by cut-planes, and its percentage of visible voxels is greater than a certain number. If such a node is found or a node is fully empty or fully clipped, all the children of the node are skipped. For fusion, the traversal also looks for fully invisible node. The invisible node is returned as a good node by the traversal iterator (see the above referenced Published U.S. Patent Application Pub. No. 2006/0164410), but with a special empty region flag set, indicating this is an invisible block.

Figure 6:
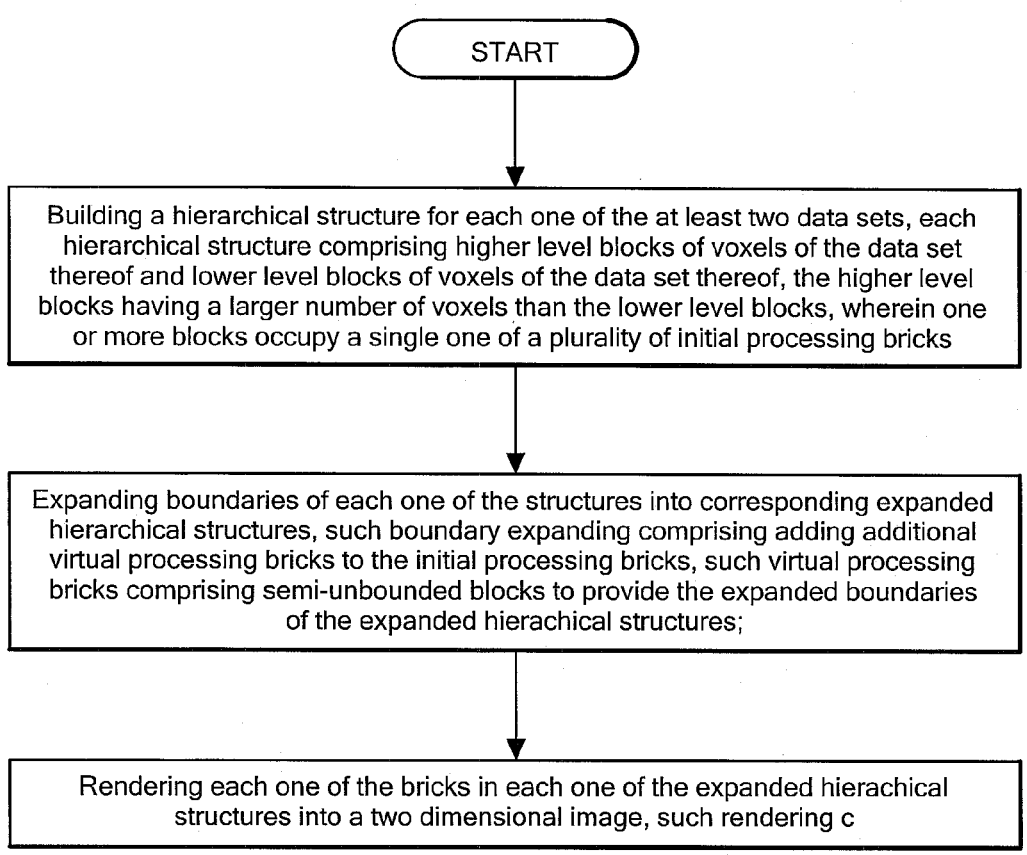
FIG. 6 is a flowchart of the overall process.
Figure 7:
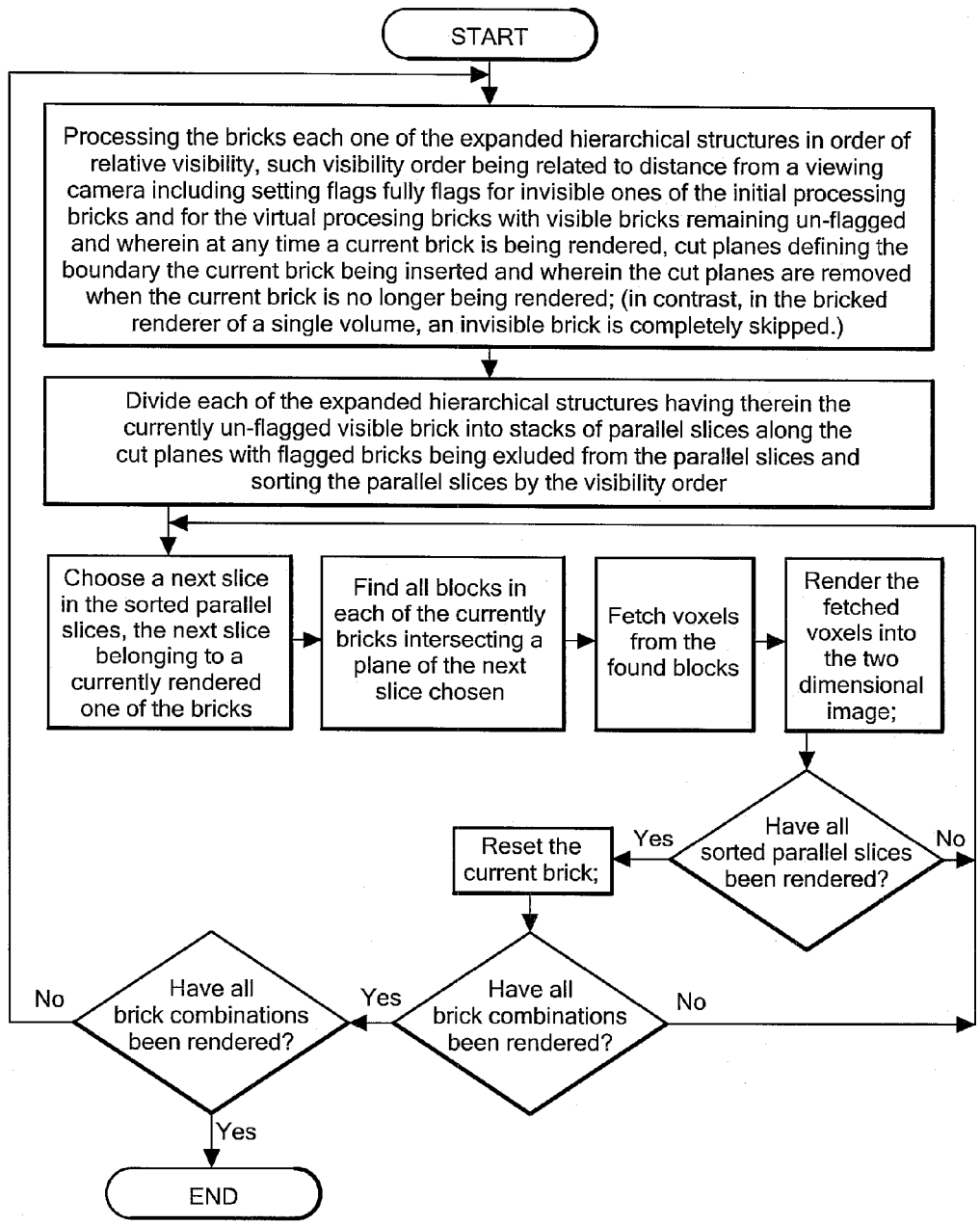
FIG. 7 is a flowchart of the rendering portion of the process is shown in more detail in the flowchart of FIG. 6.

A flowchart of the overall process is shown in FIG. 6 and of the rendering portion of the process is shown in more detail in the flowchart of FIG. 7.

Thus, referring to FIGS. 6 and 7, the method includes (a) building a hierarchical structure for each one of the at least two data sets, each structure comprising higher level blocks of voxels and lower level blocks of voxels, the higher level blocks having a larger number of voxels than the lower level blocks; (b) expanding boundaries of each one of the structures into corresponding expanded hierarchical structures, such boundary expanding comprising adding additional virtual processing bricks to the initial processing bricks, such virtual processing bricks comprising semi-unbounded blocks to provide the expanded boundaries of the expanded hierarchical structures; and (c) rendering each one of the bricks in each one of the expanded hierarchical structures into a two dimension image. The rendering comprises: (i) processing the bricks each one of the expanded hierarchical structures in order of relative visibility, such visibility order being related to distance from a viewing camera including setting flags for invisible ones of the initial processing bricks and for the virtual processing bricks with visible bricks remaining un-flagged and wherein at any time a current brick is being rendered, cut planes defining the boundary the current brick being inserted and wherein the cut planes are removed when the current brick is no longer being rendered; (ii) dividing each of the expanded hierarchical structures having therein the current un-flagged brick into stacks of parallel slices along the cut planes with flagged bricks being excluded from the parallel slices and sorting the parallel slices by the visibility order; (iii) choosing a next slice in the sorted parallel slices, the next slice belonging to a currently rendered one of the bricks; (iv) finding all blocks in each of the currently bricks intersecting a plane of the next slice chosen in the (iii); (v) fetching voxels from the founds blocks; (vi) rendering the fetched voxels into the two dimensional image; (vi) repeating (iii) through (v) until all of the sorted parallel slices are rendered; and (vii) resetting the current brick.

Steps (i) through (vii) are repeated until all brick combinations are rendered.

It is noted that the parallel slices may be chosen independently for each of the expanded hierarchical structures to render interleaved slices A number of embodiments of the invention have been described. Nevertheless, it will be understood that various modifications may be made without departing from the spirit and scope of the invention. Accordingly, other embodiments are within the scope of the following claims.

What is claimed is:

1. A method for combining at least two unregistered three-dimensional (3D) image data sets to generate a composite image from the data sets, comprising:
   dividing each of the data sets into a plurality of bricks along three mutually orthogonal axes, wherein each brick is further subdivided into a plurality of blocks along the three mutually orthogonal axes;
   merging the blocks into a hierarchical tree structure for each of the at least two data sets, with each block being a leaf node and a root of each tree structure being a union of all blocks that correspond to the data set;
   expanding, using a computing device, one tree to cover a full space of the at least two 3D image data sets by adding an expanded root that covers all image data sets, and by adding internal expanded nodes for the other tree structures, wherein each expanded node has one or more boundary faces defined at infinity; and
   traversing the expanded tree top down from the root to render the expanded data set, wherein each brick of an image data set volume is tested with all bricks of other image data sets whether they overlap, wherein if a common region exists, rendering is performed.

2. The method of claim 1, further comprising:
   dividing each of the data sets into stacks of parallel slices and sorting the slices by visibility order, wherein each block of each brick is rendered slice-by-slice skipping invisible blocks, wherein if a current brick of a data set is invisible, the brick is not sliced.

3. The method of claim 1, wherein rendering is restricted to a common region of current active bricks, defined by inserting cut-planes onto faces of the bricks, expanded nodes and visible, unexpanded intermediate nodes are used to apply cut-planes that divide the image data sets into regions, wherein a region defined by a set of cut planes of an image data set contains at most one brick of the same image data set, and wherein cut-planes between visible and invisible bricks are ignored for bricks that fall completely outside of a view port, and a cut-plane between an empty brick in a middle of the stack and a neighboring non-empty brick is removed.

4. The method of claim 3, further comprising, when an invisible block can be skipped, searching for a largest node that satisfies a criteria for rendering, and skipping all child nodes of that node.

5. The method of claim 4, wherein a criterion for rendering a node is that the node is not fully clipped by cut-planes, and that its percentage of visible voxels is greater than a predetermined number.

6. A program storage device readable by a computer, tangibly embodying a program of instructions executable by the computer to perform the method steps for combining at least two unregistered three-dimensional (3D) image data sets to generate a composite image from the data sets, comprising:
dividing each of the data sets into a plurality of bricks along three mutually orthogonal axes, wherein each brick is further subdivided into a plurality of blocks along the three mutually orthogonal axes;
merging the blocks into a hierarchical tree structure for each of the at least two data sets, with each block being a leaf node and a root of each tree structure being a union of all blocks that correspond to the data set;
expanding one tree to cover a full space of the at least two 3D image data sets by adding an expanded root that covers all image data sets, and by adding internal expanded nodes for the other tree structures, wherein each expanded node has one or more boundary faces defined at infinity; and
traversing the expanded tree top down from the root to render the expanded data set, wherein each brick of an image data set volume is tested with all bricks of other image data sets whether they overlap, wherein if a common region exists, rendering is performed.

7. The computer readable program storage device of claim 6, the method further comprising:
dividing each of the data sets into stacks of parallel slices and sorting the slices by visibility order, wherein each block of each brick is rendered slice-by-slice skipping invisible blocks, wherein if a current brick of a data set is invisible, the brick is not sliced.

8. The computer readable program storage device of claim 6, wherein rendering is restricted to a common region of current active bricks, defined by inserting cut-planes onto faces of the bricks, expanded nodes and visible, unexpanded intermediate nodes are used to apply cut-planes that divide the image data sets into regions, wherein a region defined by a set of cut planes of an image data set contains at most one brick of the same image data set, and wherein cut-planes between visible and invisible bricks are ignored for bricks that fall completely outside of a view port, and a cut-plane between an empty brick in a middle of the stack and a neighboring non-empty brick is removed.

9. The computer readable program storage device of claim 8, the method further comprising, when an invisible block can be skipped, searching for a largest node that satisfies a criteria for rendering, and skipping all child nodes of that node.

10. The computer readable program storage device of claim 8, wherein a criterion for rendering a node is that the node is not fully clipped by cut-planes, and that its percentage of visible voxels is greater than a predetermined number.

* * * * *